March 1, 1932. O. HAUGE 1,847,340
PASTRY CONE BAKING MACHINE
Filed Aug. 26, 1929 3 Sheets-Sheet 3

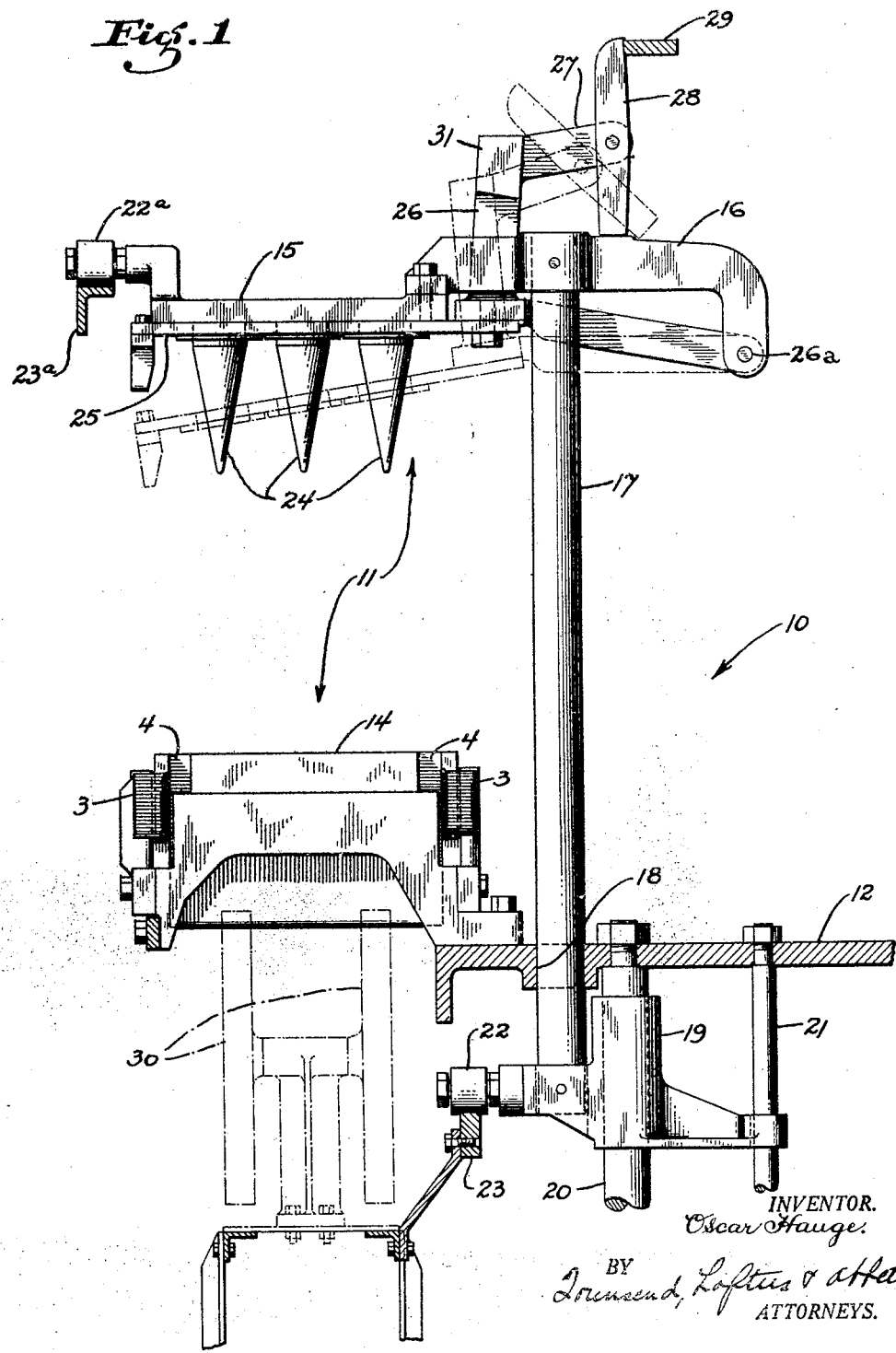

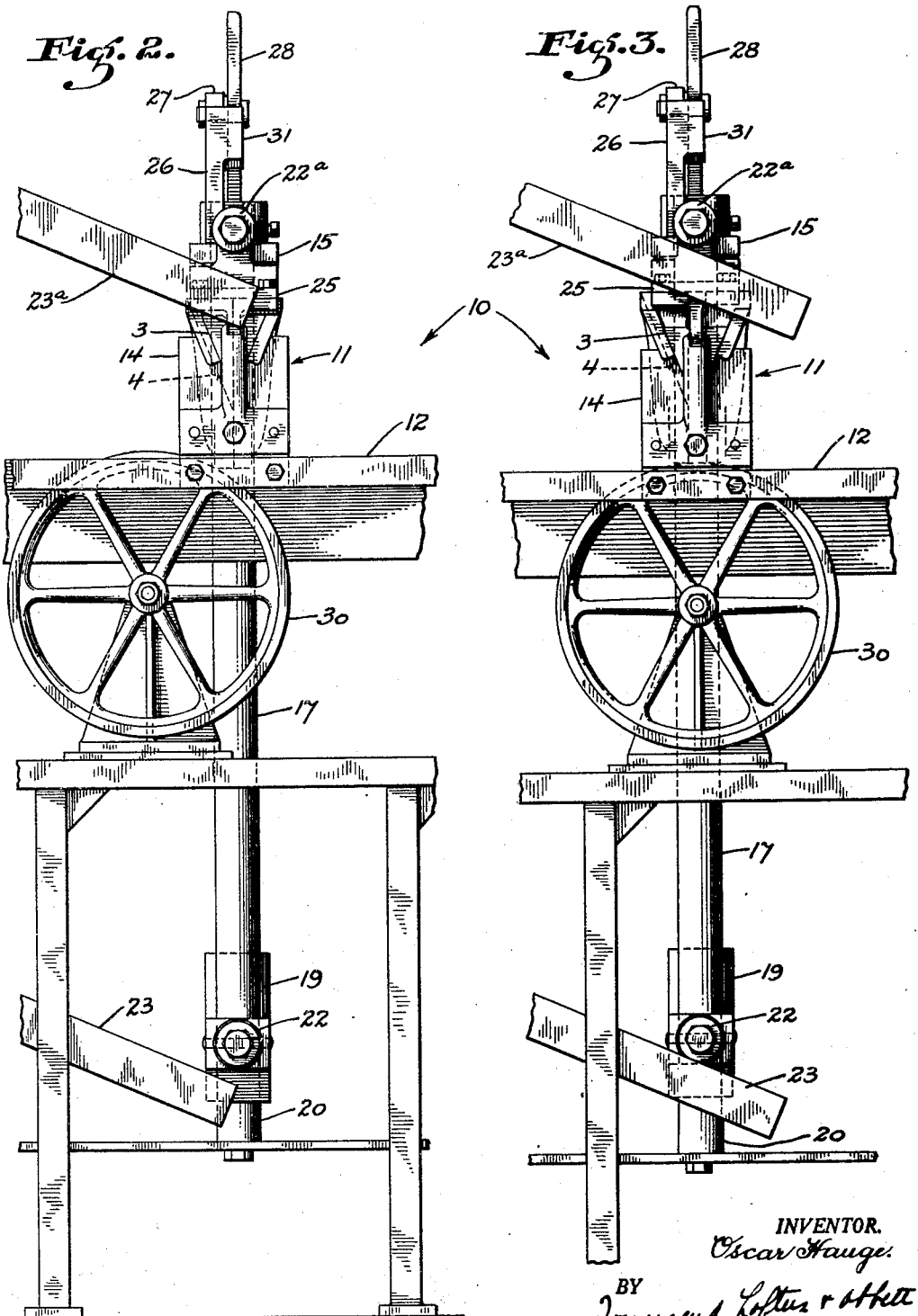

INVENTOR.
Oscar Hauge.
BY
ATTORNEYS.

Patented Mar. 1, 1932

1,847,340

UNITED STATES PATENT OFFICE

OSCAR HAUGE, OF SAN MATEO, CALIFORNIA, ASSIGNOR TO NATIONAL BISCUIT COMPANY, A CORPORATION OF NEW JERSEY

PASTRY CONE BAKING MACHINE

Application filed August 26, 1929. Serial No. 388,554.

This invention relates to pastry baking machines, and it particularly pertains to machines for baking pastry cones.

In general, prior machines include a rotating table or frame equipped with a plurality of spaced and radially arranged molding units. These units are automatically operated to receive the batter, form the cones, pass through a heated zone to bake the cones and then discharge the baked cones during continuous cycles of operation. Each molding unit comprises a mold and a core carrier which is hinged to the mold and depends upon swinging movement for its operation relative to the mold during the cycle of operation of the unit. This prior construction has not proven entirely satisfactory, and therefore, it is the principal object of the present invention to generally improve the construction and operation of the molding units in machines of the character referred to by separating the core carrier from the mold by moving the former in a straight path when closing the mold to form the cones and when removing the cores from the mold to extract the baked cones. This insures positive and proper extraction of the baked cones.

Other objects of my invention are to provide improved means for stripping or discharging the baked cones from the cores after the cores with the cones adhering to them have been raised out of the mold units, and to provide an improved mold unit and means for opening and closing the mold sections so that the baked cones will positively adhere to the cores.

In carrying the above and other objects into practice, I cause the molding units to travel in a circular path. The core carrier is vertically reciprocable so that it may cooperate with the mold in automatically forming, baking and extracting the pastry cones. This enables me to use cores of any desired configuration and maintain proper alignment and cooperative action between the cores and the mold.

Figure 4:
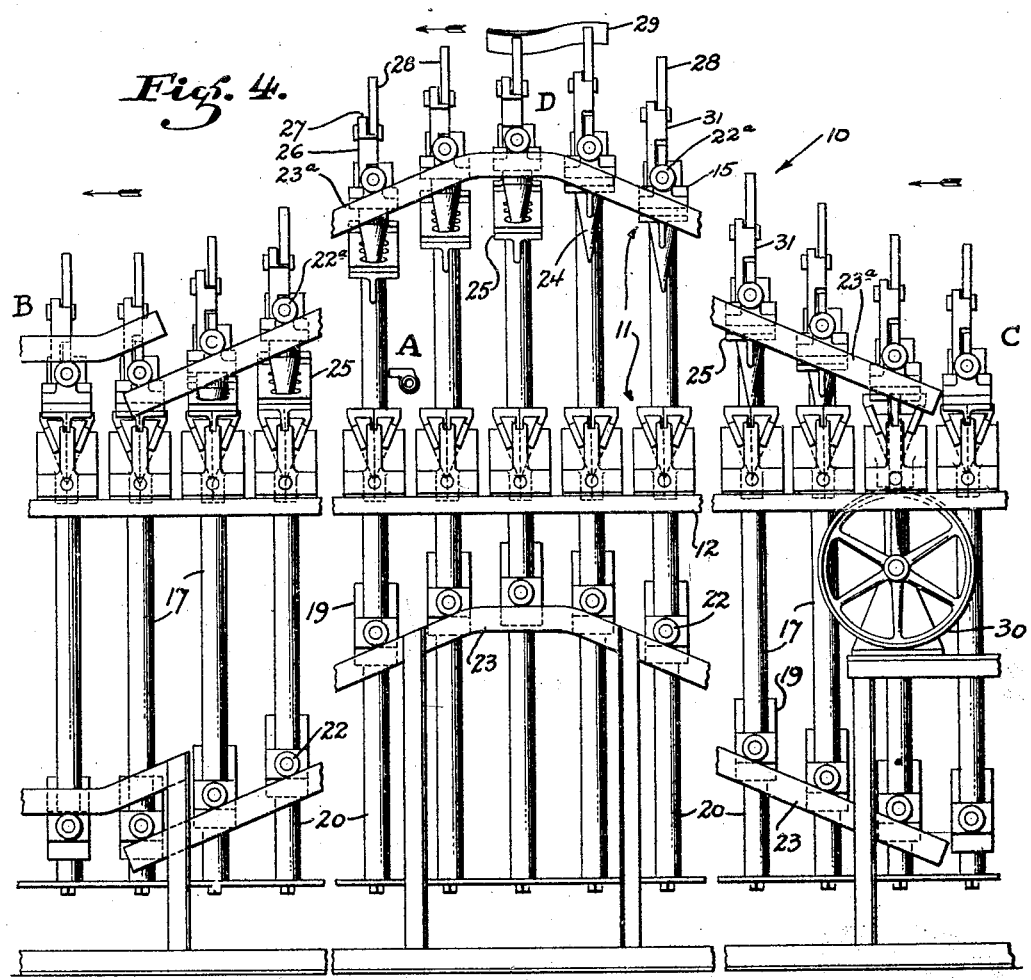
Figure 5:
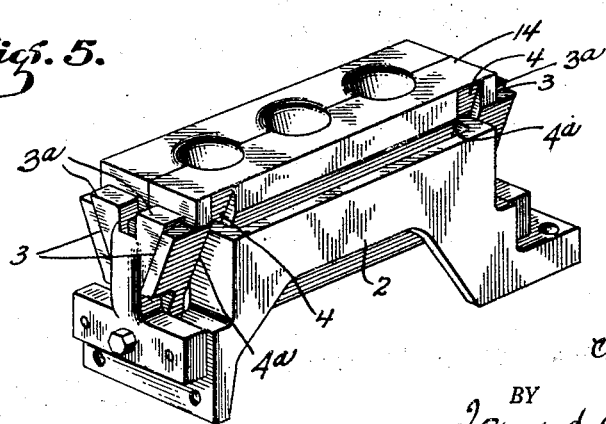

One form which the invention may assume is exemplified in the following description and illustrated by way of example in the accompanying drawings, in which:

Fig. 1 is a fragmentary view in elevation of one of the mold units of a pastry baking machine, Fig. 2 is a fragmentary view in side elevation of the machine disclosing one of the units at the mold opening station, Fig. 3 is a similar view showing the molding unit at the extraction station, Fig. 4 is a developed diagrammatic view illustrating one cycle of operation of a molding unit, Fig. 5 is a fragmentary perspective view of one of the molds.

Referring more particularly to the drawings, 10 indicates a pastry baking machine which is particularly adapted for baking pastry cones. This machine includes a plurality of radially disposed molding units 11, best illustrated in Fig. 1. These molding units are mounted upon a revolving table or frame 12 which, during the operation of the machine, revolves continuously at a constant rate of speed about a fixed center.

Each divided mold unit 11 comprises a mold 14, and a hollow frame 2 within which two mold halves are disposed. These mold halves are vertically reciprocable in the hollow frame 2. Cooperating cam surfaces 3 and 4 are formed in the mold halves and on the frame 2, so that upward movement imparted to the mold halves will cause them to separate. The cam surfaces 3 and 4 also cause downward movement of the mold halves to close the mold. This structure is best illustrated in Fig. 5. The mold halves are formed with cone-shaped sockets of dimensions agreeing with the exterior dimensions of the cones to be formed.

The frame 2 has a V-shaped cam at each end having inclined or cam faces $3a$ that cooperate with the cam surfaces 3 to open or separate the mold halves when they are moved upwardly in the frame. The frame also has two inclined or cam faces $4a$ at each end cooperating with the cam surfaces 4 to close or force the mold halves together when they drop back into the frame.

Each molding unit is fitted with a core carrier 15, which is in vertical alignment with the mold 14. This core carrier is formed with a horizontal arm 16 which is securely fastened to a vertical core operating rod 17. This rod is guided for vertical reciprocation through the table 12 in a guide 18. At its lower end the core carrier operating rod 17 is fixed to a crosshead 19, which is vertically reciprocable on guide rods 20 and 21 fixed to the table or frame 12, and depending below the table 12. This crosshead is fitted with a cam roller 22 engaging a core operating cam 23. This cam is in arcuate form, and its operation will hereinafter be described.

The core carrier 15, in the present instant, is provided with three cone-shaped cores 24, which are spaced apart and which are in exact alignment with the cone-shaped sockets in the mold 14. The cores 24 depend from, and are rigidly fixed to the core carrier 15, and are of dimensions agreeing with the interior dimensions of the pastry cones to be formed.

Arranged on the under side of the core carriers 15 and embracing the cores 24 is a stripper plate 25, which is pivoted as at 26a to the arm 16 of the core carrier 15. When the core carrier is assembled relative to the mold, the stripper plate 25 is interposed between the upper surface of the mold 14 and the bottom surface of the carrier 15. After the cores have been extracted from the mold 14, the stripper plate is operated to remove the baked cones from the cores 24.

To accomplish this the stripper plate 25 is fitted with a vertical arm 26, which extends vertically beyond the arm 16 and is formed with an angularly projecting portion 27. A trigger 28 is centrally pivoted to the portion 27 of the arm 26, and its lower end is adapted to engage the arm 16, and its upper end is adapted to engage a trip cam 29. When the core carrier 15 has been moved vertically to the position shown in Fig. 1, and the molding unit has been raised to the stripping station, the cam 29 trips the trigger 28 and the weight of the stripper plate 25 causes it to swing to a lowered position, as shown in dotted lines in Fig. 1, thereby stripping the baked cones from the cores 24.

In operation of the machine referred to in Fig. 4, a proper amount of batter is automatically injected into the molds at the station A, at which time the cam 23 commences to lower the crosshead 19 and the carrier rod 17, causing the core carrier to lower toward the mold. The outer end of the carrier is fitted with a cam roller 22a, operating on a cam 23a. This cam is of the same configuration as the cam 23, so that the inner and outer ends of the carrier plate will lower in unison in a perfectly vertical path. As the molding unit reaches the station B, the core carrier plate 15 will be in proper position relative to the mold 14, with the cores 24 projected within the mold sockets in the mold 14. This position is maintained while the molding unit is passed through a heating zone and the pastry cones in the molding unit are properly baked.

As the molding unit emerges from the baking oven it reaches a station C, at which time the mold 14 (see Figs. 2 and 3) engages a freely revolvable wheel or cam 30, which is mounted on the fixed frame of the machine. This wheel is arranged vertically with its periphery in the path of the molding unit, and with its top disposed slightly above the track about which the molding unit rides. Engagement of the bottom of mold 14 with the periphery of the wheel 30 elevates the mold halves and causes them to spread slightly, due to the operation of the cam faces 3, 3a, releasing the pastry cones therein.

At this point the cam roller 22 on the crosshead 19 engages the cam 23. The formation of this cam is such that it immedately commences to move the carrier 15 vertically, which extracts the cores with the cones thereon from the mold 14. This vertical movement of the carrier 15 continues until the high point of the cams 23 and 23a is reached. This point is indicated by the letter D in Fig. 4.

Upon reaching this station the upper end of the trigger 28 engages the tripper cam 29, and releases the stripper plate 25. The weight of this stripper plate causes it to lower and strips the cones from the cores 24. The downward movement of the stripper plate 25 is limited by engagement of a lug or projection 31 formed on the vertical arm 25, with the core carrier arm 16, as shown in Fig. 1.

As the molding units move away from the station D, the trigger disengages from the tripper cam 29, and as the carrier plate 15 lowers into engagement with the mold 14, the latter will move the stripper plate 25 upwardly into proper position. The tripper lever 28 is so designed that it will automatically assume a vertical position, latching the tripper plate into the position shown in full lines in Fig. 1.

I desire to point out here that after the molds have passed over the wheel 30 and the cores 24 have been extracted therefrom, the halves of the mold 14 automatically close, due to their weight causing them to lower in the mold frame 2, and the cam faces 4, 4a by their wedging action forcing the mold halves tightly together.

It is obvious from the foregoing that the cores 24 move in a vertical path co-axially of the sockets in the mold 14. This insures that the baked cones will be properly extracted from the mold regardless of the configuration of the cores 24. Thus I can provide the cores 24 with parallel sides in lieu of the tapered formation disclosed herein. In prior structures it was necessary that the cores be tapered so that proper clearance would be provided when the cones were extracted from the mold by the pivotal action of the core carriers.

I desire to point out that the guide rods 20 and 21 extend below the table or frame 12. This is important, as it is necessary to maintain the crosshead 19 perfectly lubricated. By arranging a guiding means for the core carrier below the table, I insure that the heat will not destroy the lubrication and cause sticking of the crosshead on its guides, which would interrupt operation of the machine.

While I have shown the preferred form of my invention, it is to be understood that various changes may be made in its construction without departing from the spirit of the invention as defined in the appended claims, and that several important features or parts of my invention such as the stripper plate locking means, and the means for opening and closing the mold sections are not limited in use to the machine illustrated, but may be applied to any of the usual types or forms of cone baking machines.

Having thus described my invention, I claim as new and desire to secure by Letters Patent of the United States the following:

1. In a pastry baking machine, a frame, a molding unit carried by the frame, each molding unit comprising a mold fixed to the frame, a core carrier having fixed cores mounted above the mold for reciprocation toward and away from the mold, a stripper plate pivotally connected to the core carrier, means normally maintaining the stripper plate latched in operative position relative to the cores, and means for unlatching the stripper plate whereby it will lower by gravity and strip pastry cones from the cores.

2. In a pastry baking machine, a frame adapted to revolve in a horizontal plane, a molding unit carried by the frame, said molding unit comprising a mold fixed to the frame, a core carrier arranged over the mold, cores secured to said carrier and depending therefrom for cooperation with the mold, guide means depending below the frame, a crosshead mounted on said guide means for vertical reciprocation, a rigid rod extending vertically through the frame and fixed at its lower end to said crosshead, a connection between the upper end of the rod and the core carrier whereby vertical reciprocation of the crosshead will be accomplished by vertical reciprocation of the core carrier, a stripper plate arranged in cooperative relation to the cores at the under side of the core carrier, a pivotal connection between the stripper plate and the core carrier, latch means normally maintaining the stripper plate in its uppermost position, said latch means being capable of being released to permit the stripper plate to lower by gravity and strip pastry cones from the cores.

3. In a pastry baking machine, a frame, a plurality of molding units adapted to travel through continuous cycles of operation, said molding units being carried by the frame, each molding unit comprising an expansible mold, a core carrier, cores carried by the core carrier for cooperation with the mold, said core carrier being reciprocably mounted on the frame for movement in a straight path toward and away from the mold, operative means for expanding the mold and subsequently moving the core carrier to withdraw the cores from the mold, a stripper plate pivoted to the carrier, and means automatically actuating the stripper plate when the cores have been withdrawn from the mold to strip pastry cones from the cores.

4. In a cup pastry baking machine, a rotatable frame, molding units carried by the frame, each molding unit comprising a mold having pastry forming cavities therein, a core carrier having cores mounted for movement into and out of the cavities of the mold, a stripper pivotally mounted on the core carrier and adapted for movement along the cores, a latch for normally holding the stripper in position against the core carrier, and means for actuating the latch to release the stripper for movement along the cores.

5. In a cup pastry baking machine, a rotatable frame, molding units carried by the frame, each molding unit comprising a mold having pastry forming cavities therein, a core carrier having cores mounted for movement into and out of the cavities of the mold, a stripper pivotally mounted on the core carrier and adapted for movement along the cores, an arm on the stripper extending above the core carrier, means on the arm adapted to engage the top of the carrier and limit downward movement of the stripper, a latch on the arm for normally holding the stripper in elevated position, and means for releasing the latch.

6. In a cup pastry baking machine, a rotatable frame, molding units carried by the frame, each molding unit comprising a mold having pastry forming cavities therein, a core carrier having cores mounted for movement into and out of the cavities of the mold, a stripper pivotally mounted on the core carrier and adapted for movement along the cores, means connected to the stripper adapted to engage the carrier and limit downward movement of the stripper, means for normally holding the stripper in engagement with the carrier, and means for periodically releasing said holding means.

7. In a pastry baking machine, a movable frame, molding units carried thereby, each molding unit comprising a mold frame having sets of inclined cam faces, divided mold sections mounted for vertical and horizontal movements in said hollow frame, sets of cam surfaces on said mold sections cooperating with the sets of cam faces on said mold frame, means for raising and lowering said mold sections vertically whereby said cam faces and surfaces will cooperate to move said mold sections bodily, laterally, substantially the same distance throughout their height.

8. In a pastry baking machine, a rotatable table, a plurality of hollow frames mounted thereon, inclined cams at each end of each hollow frame, a sectional mold in each hollow frame, each mold section having a cam member at each end cooperating with the cams on the hollow frame, and means fixed in the path of movement of the mold sections periodically to raise the mold sections as they rotate with the table, the cams on the hollow frame and mold sections being shaped to separate the mold sections laterally as they are raised and to close the sections when they leave the fixed means.

9. In a pastry baking machine, a table rotatable in a horizontal plane, a plurality of mold carrying frames fixed to and rotatable with the table, opening and closing cams on the mold frames, a sectional mold in each frame, cam means on each mold section cooperating with the opening and closing cams on the frame, relatively fixed means adapted to raise each sectional mold in the frame at one point in its travel, the opening cam on the frame and cam means on the mold sections cooperating to separate the mold sections bodily laterally as they are raised, the closing cam and cam means cooperating to close the mold sections when the sectional mold has passed the said fixed means.

10. In a pastry baking machine, a mold unit comprising a hollow frame, a V-shaped cam secured to one end of the frame, an inclined cam on the frame on each side of the V-shaped cam, a sectional mold unit mounted for vertical and horizontal movements in the hollow frame, each mold section having a surface to cooperate with one side of the V-shaped cam whereby the sections are separated as they are raised in the frame, and each section having an inclined surface cooperating with one of the inclined cams to close the sections when the sections are lowered in the frame.

11. In a pastry baking machine, the combination of a rotatable table, a plurality of mold units mounted thereon; each mold unit comprising a mold frame, a sectional mold mounted in the frame and having pastry forming cavities therein, a radially extending core arm above the mold sections and having cores at its outer end, one for each mold cavity, a stripper pivotally mounted at its inner end on the core arm and at its outer end having openings receiving the cores, and means on the stripper adapted to engage the core arm and limit its downward movement along the cores; a relatively fixed cam adapted to raise the mold sections in their frames at times in their rotation; cooperating cams on the frame and mold sections for separating the mold sections laterally as they are raised and for forcing the sections together when they are again lowered in the frame.

12. In a pastry baking machine, a rotatable frame, a plurality of sectional molds mounted to rotate therewith, a plurality of core units, one with each sectional mold, a relatively fixed cam adapted to successively raise the mold sections and cores together during their rotation, inclined cams adapted to separate the mold sections bodily laterally and maintain them parallel throughout their height as they are raised, means for lifting the core units out of the mold sections after they have been separated, inclined cam means for closing the molds when they leave the fixed cam, and means for thereafter returning the core units to the closed mold sections.

OSCAR HAUGE.